June 19, 1956  K. FEDERN  2,750,795
HYDRAULIC OSCILLATING-LOAD GENERATORS, PARTICULARLY
FOR MATERIAL TESTING MACHINES
Filed Feb. 24, 1953  5 Sheets-Sheet 1

June 19, 1956  K. FEDERN  2,750,795
HYDRAULIC OSCILLATING-LOAD GENERATORS, PARTICULARLY
FOR MATERIAL TESTING MACHINES
Filed Feb. 24, 1953  5 Sheets-Sheet 2

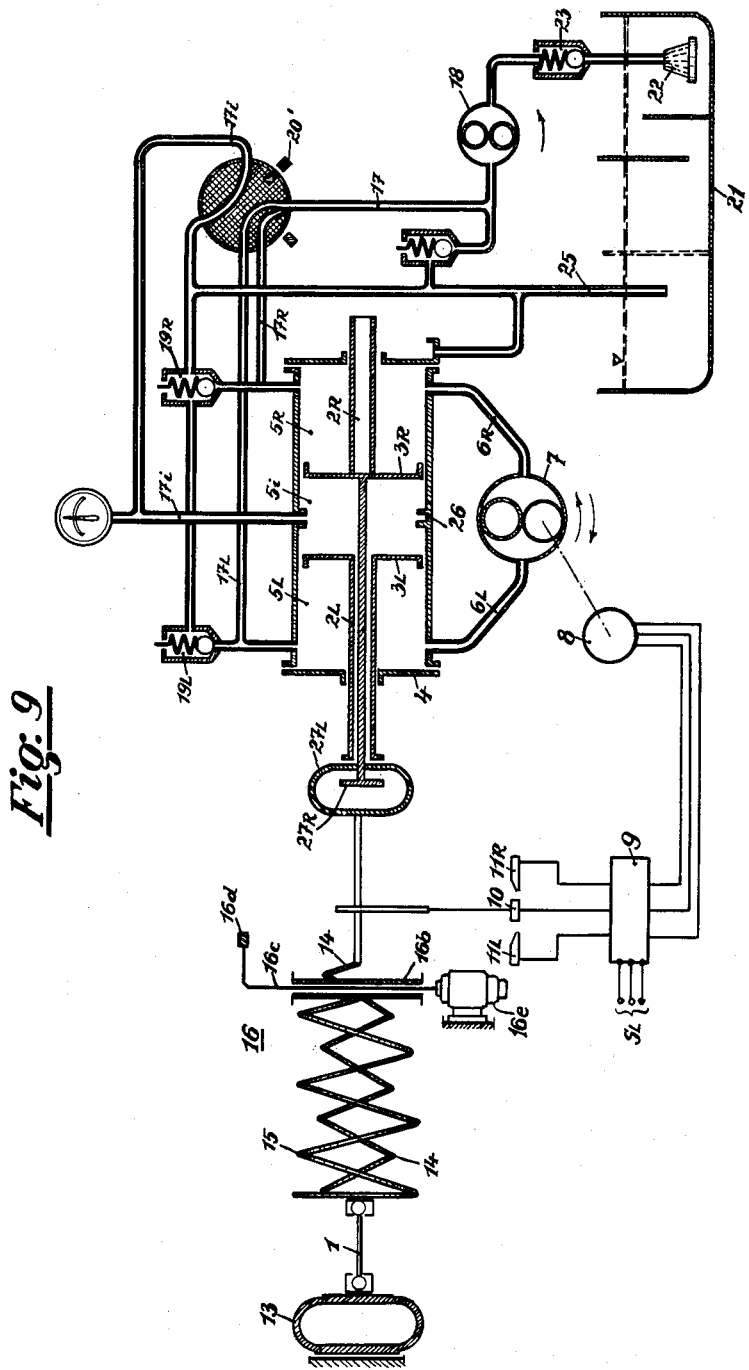

United States Patent Office 2,750,795
Patented June 19, 1956

2,750,795

HYDRAULIC OSCILLATING-LOAD GENERATORS, PARTICULARLY FOR MATERIAL TESTING MACHINES

Klaus Federn, Darmstadt, Germany, assignor to Carl Schenck Maschinenfabrik G. m. b. H., a German corporation Application February 24, 1953, Serial No. 338,485

Claims priority, application Germany February 28, 1952

6 Claims. (Cl. 73—92)

My invention relates to hydraulically operating machines for producing alternating or pulsating mechanical loads, particularly for the testing of materials.

Machines for the generation of such oscillating loads, especially in material testing machines, are sometimes required to operate with low frequencies at which these loads cannot be produced by inertia forces of oscillating masses or similar dynamic means. Therefore, various hydraulic drives have been built to operate either with valve controls or with a crank drive. In the valve-controlled machines, the occurrence of shocks during changes in pressure and hence abrupt changes in load can hardly be avoided. In machines operating with crank mechanisms and piston pumps, the regulation or adjustment of the load amplitudes causes considerable difficulties and requires a large expenditure in mechanical means, such as adjustable dual eccentrics or oscillating levers. Preference has therefore been given to producing slowly oscillating loads by means of a spindle transmission. Such transmissions have a travelling nut on a screw spindle driven in alternating directions by a chain sprocket. Driving power is supplied to the spindle through a reversible gear or through unidirectional speed-change gearing from a reversible motor. While such a spindle drive avoids shocks and may readily be adjusted in amplitude, it has a low efficiency considerable frictional heat being caused by the transmission parts sliding upon each other, and it gives frequent trouble due to play between the screw and spindle when the load passes through the zero value.

It is an object of my invention to provide a low-frequency generator for producing static or dynamic mechanical testing loads that combines the outstanding advantage of spindle-type drives, namely their facility of amplitude adjustment, with the advantages, notably the better efficiency, of the hydraulic-type drives.

To this end, and in accordance with a feature of my invention, I provide a double-acting hydraulic device with a reciprocable push-pull member that under the effect of a pulsating flow of pressure liquid is alternately subjected to unilateral over-pressure to thereby impose an alternating push-pull load upon the object of specimen being tested.

According to another feature of my invention, the push-pull member is formed by a piston within a pressure cylinder whose variable-volume chambers on both piston sides are connected by smooth passages of short length in a closed hydraulic circuit with a hydrostatic pump of periodically reversible direction of delivery. Preferably, the reversal in direction of pump delivery is effected by means of a reversible motor, or a motor with a reversible transmission, driving the pump in alternating directions.

These and other objects and features of my invention will be apparent, and will be referred to, in the following with reference to the embodiments exemplified by the drawings, in which—

Fig. 9 shows an alternative embodiment of the invention combining features shown in Figs. 4 and 6.

Figure 1:
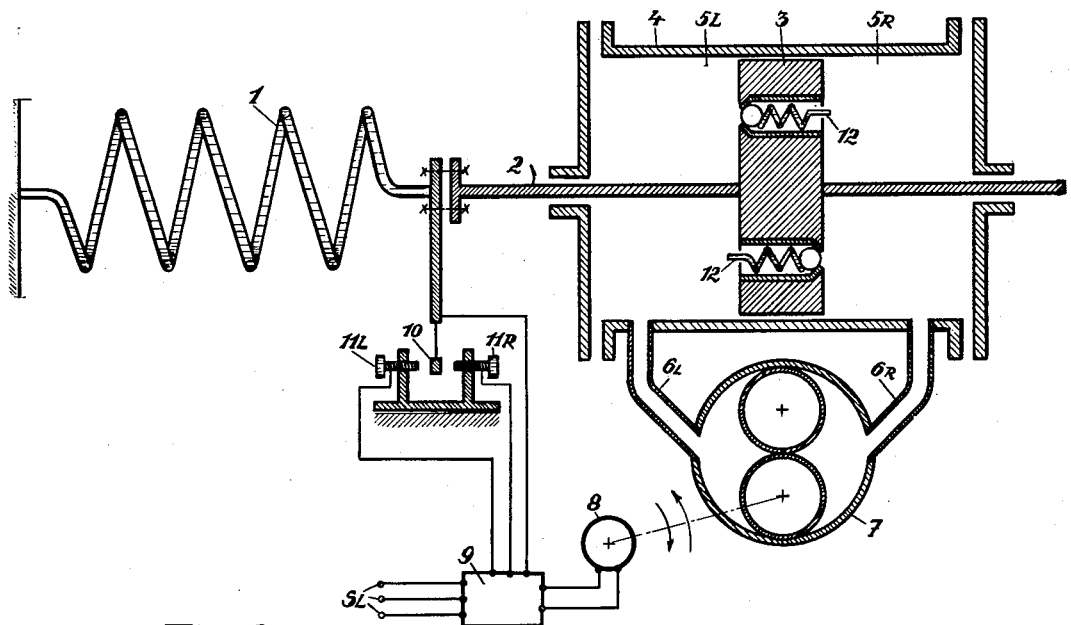
Fig. 1 shows schematically an oscillating-load generator according to the invention in one of its simplest forms.

In Fig. 1, an object to be subjected to a low-frequency load is schematically shown as a spring and denoted by 1. The object is rigidly clamped at one end. The oscillating load is applied to the other end to make it yield in dependence upon the elastic characteristics of the material or structure of the object. The oscillatory loads are produced by a piston 3 which is movable in a pressure cylinder 4 and connected with the object by a piston rod 2. The two cylinder chambers 5L and 5R are connected by conduits 6L and 6R with a pressure pump 7. This pump consists of a positive displacement pump and is shown as a gear-type pump. The pump is driven by a motor energized from a current supply line SL through a reversing relay device 9. The relay device may have any suitable design, an example being described in a later place with reference to Fig. 8. An additional pump is usually required for the replacement of leakage oil, such a pump being shown in other illustrations described below.

The relay device 9 is controlled by an electric contact device operating in the manner of a limit switch. This device has a movable contact member 10 connected with the piston rod 2 or with any other part of the machine moving in dependence upon the reciprocations of the piston. The movable contact 10 cooperates with two stationary contacts 11L and 11R so arranged and adjusted that an electric circuit is closed when the load imposed upon the specimen and hence the resulting deformation of the specimen reaches a predetermined limit. The circuit thus closed actuates a relay which causes the motor 8 to reverse its running direction.

The load generator imparts oscillatory loads to the specimen in such a manner that the direction of the load reverses automatically as soon as the amplitude limits adjusted by means of the contacts 11L and 11R are reached.

To prevent overloading of the hydraulic system, connecting passages between the two cylinder chambers may be provided with overload-responsive valves. These passages as well as the pertaining check valves may be located within the piston 3, as is shown in Fig. 1 where the valves are denoted by 12. The conduits 6L and 6R are preferably as short and smooth as possible in order to avoid any unnecessary production of frictional heat and to prevent the pressure liquid from simply performing pendulous movements between the pump and the piston when the machine operates with short strokes.

The only function of the reversible pump 7 is to pump pressure liquid from one cylinder chamber to the other. The pressure difference occurring between the two sides of the piston is thus only determined by the spring constants of the object being subjected to the load.

The above-mentioned pump for replenishing any leakage oil (see Figs. 4, 6) must simultaneously take care of having the average pressure always larger than the amplitude of the differential pressure between the two piston sides so that the pressure in chambers 5L and 5R can never drop below the atmospheric pressure. Otherwise, there may be the danger of having air sucked through the gaskets between the piston rod 2 and the cylinder covers.

Figure 2:
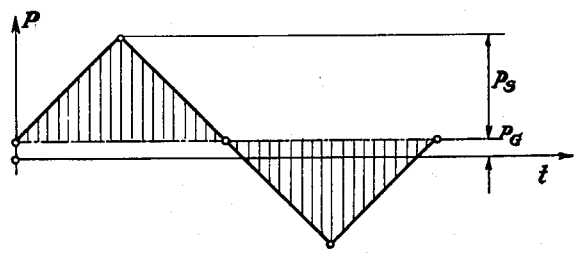
Figs. 2 and 3 are coordinate diagrams explanatory of the machine operation.

The pump 7, being driven at constant speed from the beginning to the end of each stroke, has a constant delivery per time unit within the stroke period. With such operating conditions, the pressure-time characteristic of the load generator is substantially in accordance with the co-ordinate diagram shown in Fig. 2. In Fig. 2, the ordinate indicates the automatically developing pressure difference between the two piston sides, while the abscissa denotes time. The magnitude of the pressure amplitude Ps and the medium pressure difference PG are predetermined by the selected positions of the stationary contacts 11L and 11R. The inertia moment of the motor shaft and of the rotating parts of the pump is to be kept as low as possible to obtain a short reversing period and a high accuracy of the reversing control.

Figure 3:
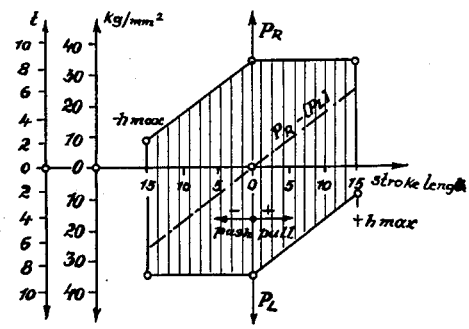

The coordinate diagram represented in Fig. 3 shows schematically the pressure difference and the forces acting upon the piston rod 2 in dependence upon the stroke length. Shown upwardly from the abscissa is the force PR acting upon the right side, and shown downwardly from the abscissa is the force PL upon the left piston side. The difference of the absolute values PL minus PR is the resultant force acting upon the object. Denoted by $+h_{max}$ and $-h_{max}$ are the stroke limits. It is assumed that the two cylinder chambers are equipped with unloading valves (see 19L and 19R in Figs. 4 and 6) so that the pressure does not exceed a given limit value in each chamber. Depending upon the position of the contacts 11L and 11R, the oscillating load imposed upon the object may either be alternating about zero value, or it may alternate about any given positive or negative preload value, or the load may lie within the transition zone of alternating and pulsating loads.

Figure 4B:
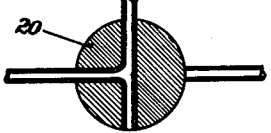
Fig. 4 shows diagrammatically a material-testing machine comprising a three-way slide valve whose additionally available positions are shown separately in Figs. 4b and 4c respectively.
Figure 4C:
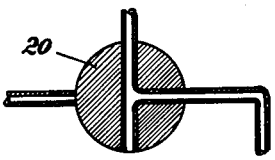
Figure 4:
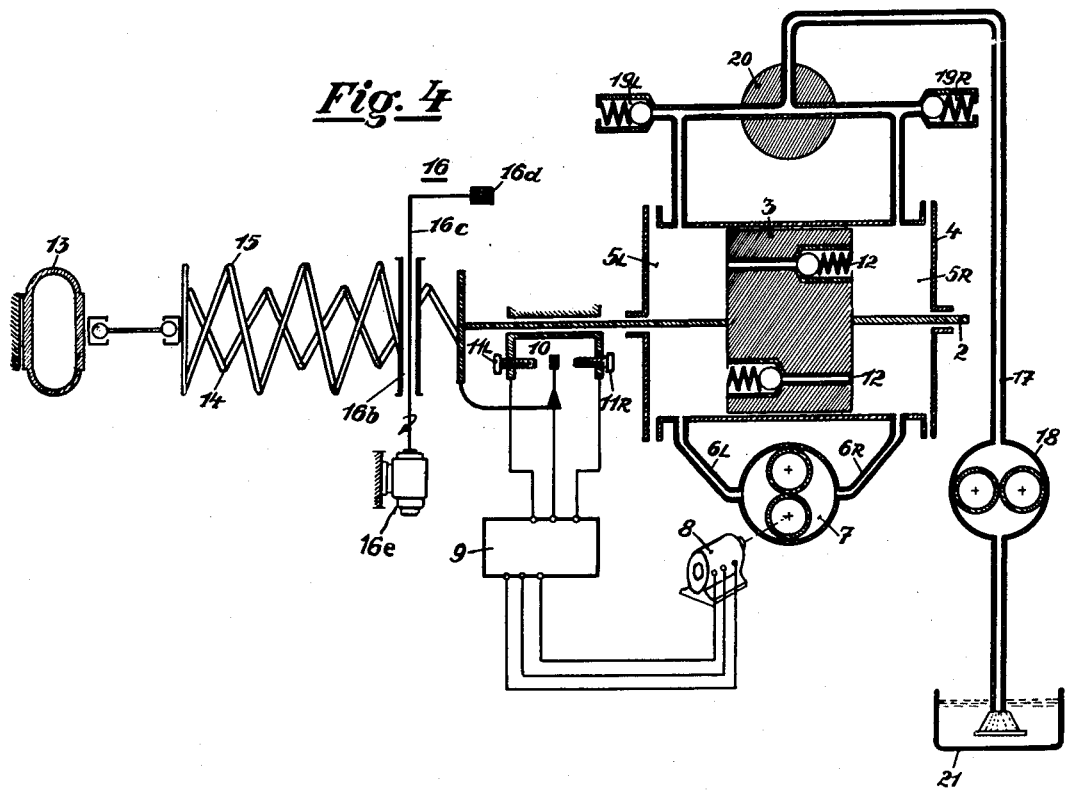

Fig. 4 shows more in detail the application of a oscillatory-load generator according to the invention with a machine for testing materials. The object 1 to be tested, here consisting of a specimen rod, is clamped on both ends in respective gripping heads. As in Fig. 1, the piston rod is denoted by 2, the piston by 3, and the cylinder by 4. The cylinder chambers 5L and 5R on the two sides of the piston are connected by conduits or ducts 6L and 6R with a positive displacement pump 7 of the spur-gear type driven by a motor 8 under control by a reversing relay device 9. A conventional force-measuring device 13 in series connected between one of the gripping heads for the specimen and a fixed and rigid abutment, to offer an electric or optic indication of the oscillatory load amplitudes. Series connected between the other gripping head and the piston rod 2 is a spring 14 which, when testing specimens of high rigidity, serves to reduce the total spring constant of the parts subjected to the load.

In addition to spring 14, the illustrated material testing machine is equipped with a spring 15 which has one end secured to the gripping head for the specimen, while its other, free end is connected with a mechanical oscillator 16. This oscillator comprises a bearing structure 16b firmly connected with the free end of spring 15, and a vertical shaft 16c revolvable in the bearing structure and equipped with an eccentric unbalance weight 16d. During operation of the oscillator 16, the oscillator shaft 16c is driven, for instance by an electric motor 16e, in order to impose, due to the unbalanced inertia forces, an oscillating load through spring 15 upon the specimen. The frequency of oscillator 16 is higher than the reciprocating frequency of piston 3. Consequently, the oscillator 16 permits imparting to the specimen 1 an oscillating load of relatively high frequency in superposition upon, or independently of, the low-frequency load generated by the hydraulic device.

An auxiliary pump 18 is provided for replenishing leakage losses in the hydraulic system. Pump 18 is connected with the cylinder chambers 5L and 5R through a pipe 17, thus maintaining a desired medium pressure within each of the two cylinder chambers. Two unloading valves 19L and 19R, in conjunction with the check valves 12 in piston 3, take care of limiting the maximum pressure in the two cylinder chambers to predetermined values. A three-way slide valve 20 is provided to permit replenishing leakage oil in only one or the other chamber 5R and 5L, or in both chambers. The valve 20, as shown in Fig. 4, is set for delivering oil from pump 18 to both piston chambers.

Figs. 4b and 4c show the two other valve positions for supplying only one or the other of the two chambers. Either the position shown in Fig. 4b or the one according to Fig. 4c may be preferable, depending upon whether the loads are to be produced within the range of the critical expansion or critical compression values of the specimen. The leakage oil drains back into the oil reservoir 21 of the auxiliary pump 18.

Figure 5:
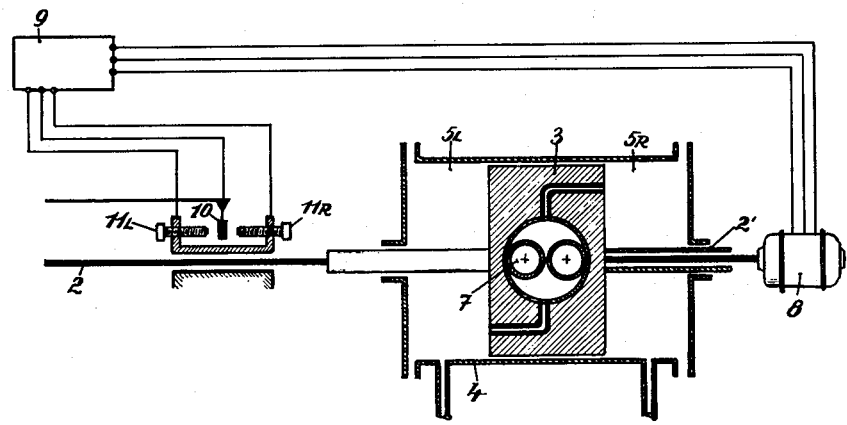
Fig. 5 shows a modified portion of a machine that is otherwise designed in accordance with the embodiments of Figs. 1, 4 or 6.

Fig. 5 represents a modification of the hydraulic piston and the reversible pump. For obtaining hydraulic passages of the shortest possible length, the reversing pump 7 is mounted within the piston 3 itself and is connected by respective ducts with the chambers 5L and 5R. One portion 2' of the piston rod is tubular. The reversible electric motor 8 is connected with the pump 7 by a shaft which extends through the tubular rod portion 2'. The motor 8 may be mounted together with the tubular portion 2' so that it participates in the reciprocating movements of the piston. The cylinder 4 is shown equipped with conduits that communicate with the respective chambers 5L and 5R for supplying leakage replacement oil from an auxiliary pump and for maintaining desired medium and maximum pressures as described in conjunction with Fig. 4.

For the investigation of the operational strength of materials and structures under conditions simulating those occurring in the actual use or operation of the materials, it is desirable to apply low-frequency loads alternating with oscillatory loads of high frequency. It is, therefore, often required to permit generating high-frequency loads separately from, and in a given alternation with, low-frequency loads. Such an alternate operation of a high-frequency generator and a hydraulic low-frequency generator is readily possible with a machine according to Fig. 4 due to the provision of the intermediate spring 14 and the piston rod 2. The spring 14 provides resilient coupling between the specimen 1 and the piston rod 2, whereby the higher frequency load generated by the oscillator 16 can be superimposed upon or applied independently through the spring 15. There are cases, however, where the insertion of an amplitude-reducing spring is undesirable. According to another feature of the invention, therefore, the piston of the hydraulic load generator is subdivided to permit uncoupling the hydraulic load generator from the specimen. The testing machine shown in Fig. 6 is equipped with such a subdivided piston for hydraulically coupling and uncoupling the specimen.

Figure 6:
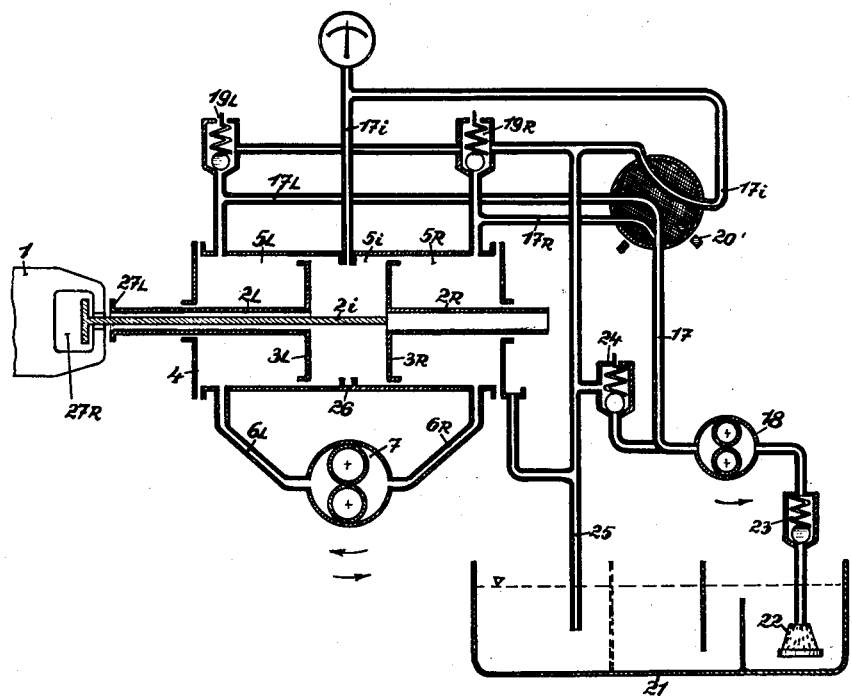
Fig. 6 shows diagrammatically another testing machine, of a more elaborate design.

In the machine according to Fig. 6, the piston rod is composed of three portions 2L, 2R and 2i, and the piston is formed by an assembly of two portions 3L and 3R. The specimen is denoted by 1, and the machine parts 4, 6L, 6R and 7 are similar to the correspondingly denoted parts in the machines according to Figs. 1 and 4. It will be understood that the machine is also equipped with a motor 8, a control relay device 9 and a pertaining contact device 10, 11L, 11R as shown in Figs. 1 and 4, although these components are omitted in the illustration of Fig. 6.

The two piston portions 3L and 3R partition the cylinder space into three chambers 5L, 5R and 5i. The parts 17, 18, 19L, 19R and 21 are similar to the correspondingly denoted parts shown in Fig. 4 described above. However, a differently designed control valve 20′ is provided to make this valve applicable not only for controlling the flow of leakage replacement oil but also for switching the device between hydraulic coupling and uncoupling. The auxiliary pump 18 inducts oil from the oil container 21 through a filter basket 22 and a check valve 23. Part of the oil may pass through an unloading valve 24 and a return line 25 back into the oil container 21. When the rotary slide valve 20′ is in the position shown in Fig. 6, the pump 18 delivers oil through line 17 into two branch conduits 17L and 17R and thus into the two cylinder chambers 5L and 5R. The central cylinder chamber 5i is then connected through a line 17i and through the slide valve 20′ with the return line 25. The operation of the pump 18, therefore, has the effect of forcing the two piston portions 3L and 3R toward each other, thus releasing the connection between the specimen 1 and the piston assembly. The two piston parts then remain stationary in a position determined by stops 26 in the cylinder.

Figure 7:
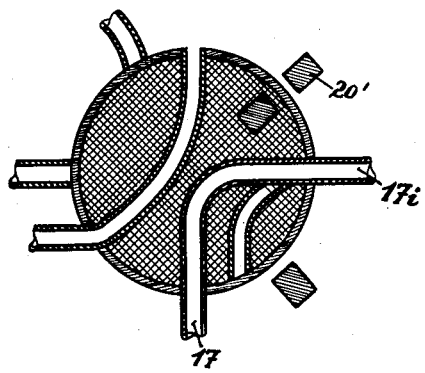
Fig. 7 shows a slide valve of the same machine in a position different from that shown in Fig. 6.

For coupling the hydraulic load generator with the specimen 1, the slide valve 20′ is placed into the position shown in Fig. 7. The pressure oil from pump 18 then flows through line 17 into the line 17i and hence into the central cylinder chamber 5i. The oil drives the two piston parts 3L and 3R away from each other until two abutments 27L and 27R of the respective piston rod portions 2L and 2i are firmly forced toward each other and against the specimen. The unloading valve 24 is adjusted to a higher pressure than the valves 19L and 19R. Therefore, the same flow quantity of oil that enters into the chamber 5i is forced out of the chambers 5L and 5R through the valves 19L and 19R into the common return line 25. Consequently, as soon as the specimen 1 is firmly connected with the two piston rod portions 2L and 2R by the abutments 27L and 27R, the piston assembly behaves as a rigid unit and the pump 18 operates only to replace leakage oil. The pressure in chamber 5i is determined by the pressure setting of valve 24. The maximum pressures in chambers 5L and 5R are determined by the pressure setting of valves 19L and 19R. The diameter of the piston rod portions 2L and 2R are equal so that, during the operation of the reversing pump 7, the volumetric reduction of chamber 5L is equal to the volumetric increase of chamber 5R and vice versa.

Fig. 9 illustrates an embodiment of the invention utilizing the hydraulic oscillator of Fig. 6, described above, in combination with the spring load transmission system shown in Fig. 4.

The above-described relay device 9 for periodically reversing the running direction of the pump motor 8 in dependence upon predetermined amplitudes of the generated periodic load may consist of any electrically controllable reversing switches generally known and available for motor control purposes, the particular design of this device being inessential to the invention. A reversing control suitable for all above-described embodiments of the invention is exemplified by the circuit diagram shown in Fig. 8.

Figure 8:
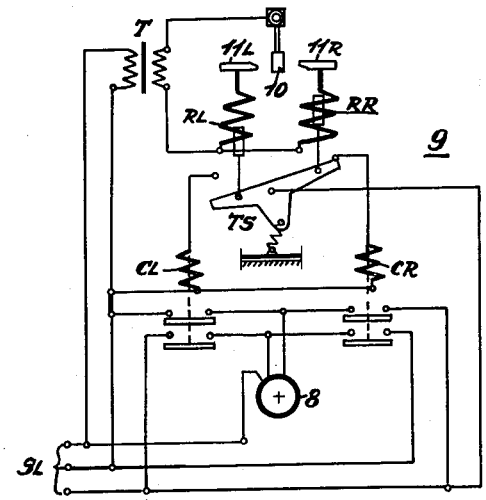
Fig. 8 shows the circuit diagram of an electric control device applicable in machines according to the preceding figures.

According to Fig. 8, the reversible three-phase electric motor 8 for driving the pump is connected to the three-phase current supply line SL by means of selectively operable normally open current relays CL and CR adapted to interchange phase connections to the motor to control its direction of rotation depending upon which relay is energized. The relays CL and CR are energized from the supply line SL through a toggle-joint switch TS so that only one relay can close at a time depending upon the position of switch TS. Switch TS is controlled by two relay coils RL and RR which are energized from the supply line SL through a step-down transformer T under control by the movable contact 10 and the stationary contacts 11L and 11R of the position-responsive contact device described in the foregoing. When the load produced by the load generator reaches a given amplitude, one of the contacts 11L and 11R is engaged by contact 10 thus causing one of relay coils RL and RR to apply an actuating pulse to the switch TS to throw it and thereby change energization in the current relays CL and CR from one to the other to reverse the motor 8.

It will be obvious to those skilled in the art upon a study of this disclosure that machines according to my invention may be modified and altered in various respects and may be embodied in designs other than those specifically illustrated and described, without departing from the essence of the invention and within the scope of the claims annexed hereto.

I claim:

1. A pulsating load generator for imposing mechanical loads upon a specimen to be tested, comprising a hydraulic device having a reciprocating member and having variable-volume chambers for pressure medium on both sides respectively of said member, said reciprocating member forming one wall each of said variable-volume chambers, hydraulic pressure supply means of reversible pressure direction interconnecting said chambers and having pressure reversing control means, position-responsive means connected between said member and said control means for causing said control means to reverse the pressure direction of said supply means at predetermined stroke positions of said member, connecting structure joining said member with one end of the specimen to be tested, means for flexing the other end of said specimen, and a mechanical oscillator of a higher stroke frequency than said member connected with the movable end of said specimen, whereby said member and said oscillator may impose loads on the specimen.

2. A pulsating load generator for imposing mechanical loads upon a specimen to be tested, comprising a hydraulic device having a reciprocating member and having variable-volume chambers for pressure medium on both sides respectively of said member, said reciprocating member forming one wall each of said variable-volume chambers, hydraulic pressure supply means of reversible pressure direction interconnecting said chambers and having pressure reversing control means, position-responsive means connected between said member and said control means for causing said control means to reverse the pressure direction of said supply means at predetermined stroke positions of said member, a rigid gripping structure for attachment to the specimen, first spring means connecting said structure with said member for transmitting pulsating loads from said member to said specimen, a mechanical oscillator of a higher stroke frequency than said member, and second spring means connecting said oscillator with said structure in parallel relation to said first spring means for transmitting oscillatory loads from said oscillator to said specimen.

3. A generator for producing mechanical pulsating loads upon an object, comprising a hydraulic device having a cylinder and a piston assembly forming together with said cylinder a pressure chamber of variable volume at each side of said assembly respectively, a hydraulic pressure supply loop connected with said two chambers and including a constant-delivery pump and periodical flow-reversing control means for alternately reversing the hydraulic force acting upon said piston assembly, said piston assembly having two piston portions forming together with said cylinder and between each other an intermediate chamber between said two pressure chambers, a controllable liquid pressure means connected with said intermediate chamber for selectively controlling said cylinder portions to be spaced from and to be close to each other respectively, said two piston portions having respective piston rod members extending out of said cylinder and being movable relative to each other due to movement of said piston portions relative to each other, and clamping means disposed for attachment to the object and having two abutments secured to said respective piston rod members to move together therewith between object-clamping and object-releasing positions, whereby the object may be selectively coupled with and uncoupled from said piston assembly by operation of said liquid pressure means.

4. In a load generator according to claim 3, said cylinder having stationary stop means abuttable by said respective piston portions when said portions are placed close to each other.

5. A load generator according to claim 3, comprising an auxiliary pump and conduit means connecting said auxiliary pump with said two pressure chambers for replenishing leakage and maintaining a given minimum pressure in said pressure chambers, said controllable liquid pressure means being also connected with said auxiliary pump to receive therefrom liquid under pressure.

6. A generator for producing mechanical pulsating loads upon a specimen, comprising a hydraulic device having a cylinder and a piston assembly forming together with said cylinder two pressure chambers of variable volume at both sides of said assembly respectively, a hydraulic pressure supply loop connected with said two chambers and including a constant-delivery pump and periodical flow-reversing control means for alternately reversing the hydraulic force acting upon said piston assembly, said piston assembly having two piston portions forming together with said cylinder and between each other an intermediate chamber between said two pressure chambers, a controllable liquid pressure means connected with said intermediate chamber for selectively controlling said cylinder portions to be spaced from and to be close to each other respectively, said two piston portions having respective piston rod members extending out of said cylinder and being movable relative to each other due to movement of said piston portions relative to each other, a rigid gripping structure for attachment to the specimen, first spring means having one end connected with said structure, a mechanical oscillator of a higher stroke frequency than said piston assembly, second spring means connecting said oscillator with said structure in parallel relation to said first spring means for transmitting oscillatory loads from said oscillator to said specimen, and clamping means disposed for attachment to the other end of said first spring means and having two abutments secured to said respective piston rod members to move together therewith between specimen-clamping and specimen-releasing positions, whereby the specimen may be selectively coupled with or uncoupled from said piston assembly by operation of said liquid pressure means independently of said higher frequency oscillator.

References Cited in the file of this patent

UNITED STATES PATENTS

| | | |
|---|---|---|
| 1,948,951 | Walker | Feb. 27, 1934 |
| 2,194,914 | Ruch | Mar. 26, 1940 |
| 2,270,943 | Freundel et al. | Jan. 27, 1942 |
| 2,529,777 | McInnis | Nov. 14, 1950 |
| 2,693,699 | Federn | Nov. 9, 1954 |

FOREIGN PATENTS

| | | |
|---|---|---|
| 154,863 | Switzerland | Aug. 16, 1932 |
| 870,630 | France | Dec. 12, 1941 |